Sept. 16, 1930.                 C. P. ROSS                  1,775,970
                              CINDER PLANT
                         Filed Dec. 31, 1927           4 Sheets-Sheet 1

Inventor
Clyde P. Ross
by Parker & Carter
Attorneys.

Sept. 16, 1930.                C. P. ROSS                1,775,970
                               CINDER PLANT
                          Filed Dec. 31, 1927        4 Sheets-Sheet 2
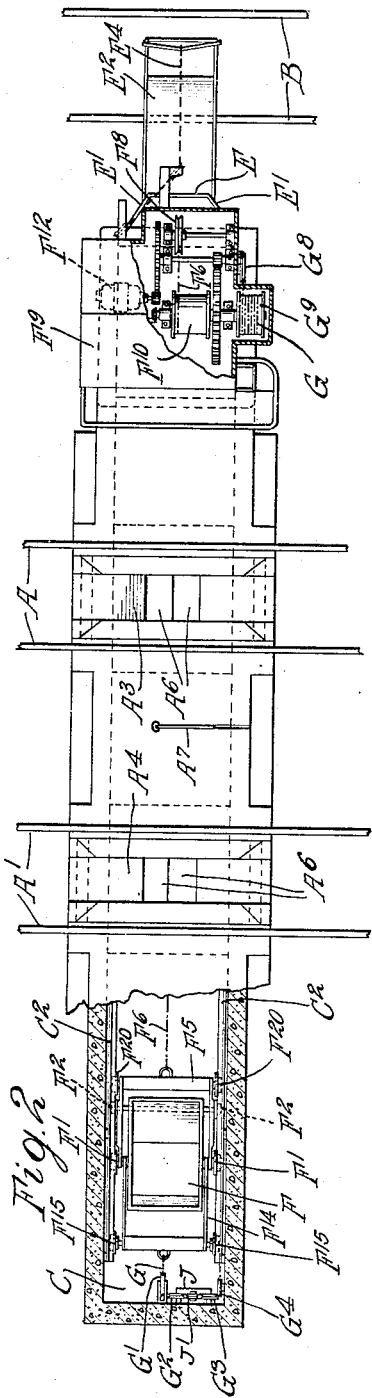
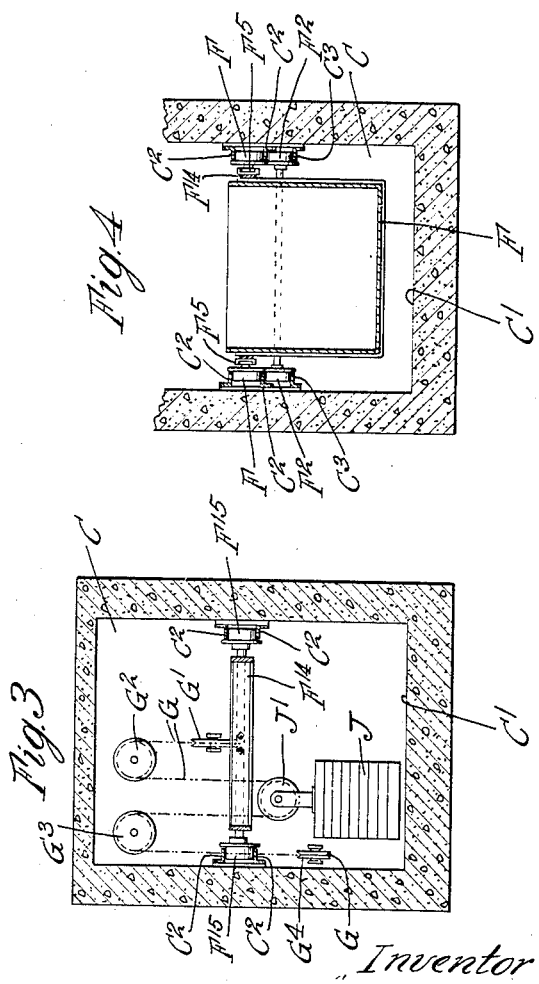
Inventor
Clyde P. Ross
by Parker + Carter
Attorneys.

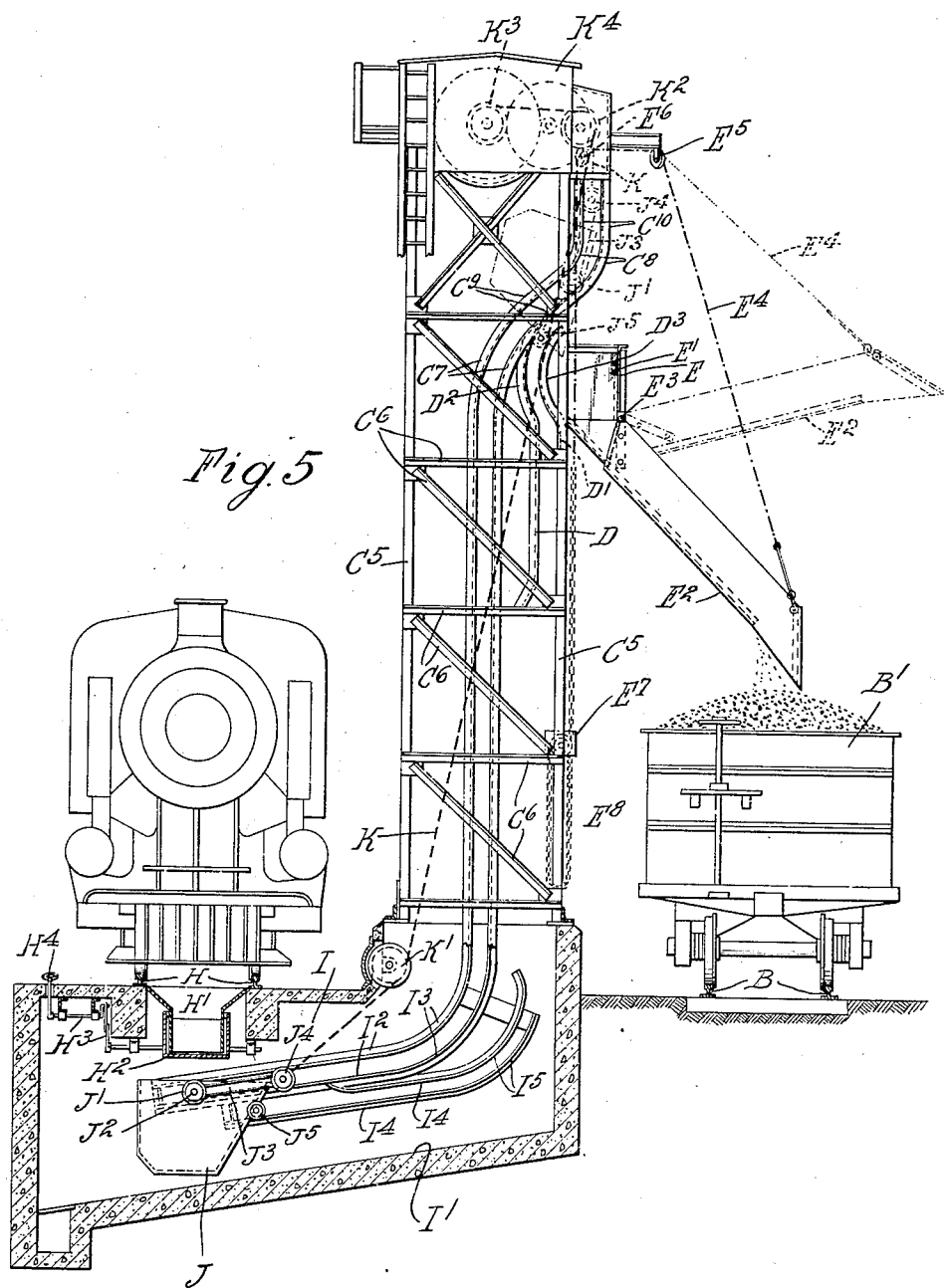

Sept. 16, 1930.  C. P. ROSS  1,775,970
CINDER PLANT
Filed Dec. 31, 1927  4 Sheets-Sheet 4

Inventor
Clyde P. Ross
by Parker + Carter
Attorneys

Patented Sept. 16, 1930

1,775,970

UNITED STATES PATENT OFFICE

CLYDE P. ROSS, OF KENILWORTH, ILLINOIS

CINDER PLANT

Application filed December 31, 1927. Serial No. 243,797.

My invention relates to a locomotive cinder plant and has for its purpose to provide a plant in which cinders may be received from locomotives and may be transported to cinder receiving and removing cars. One object is the provision of a plant of the type described which shall be compact and easily operated and which shall involve a minimum of excavation and construction. Other objects will appear from time to time in the course of the specification and claims.

Figure 1:
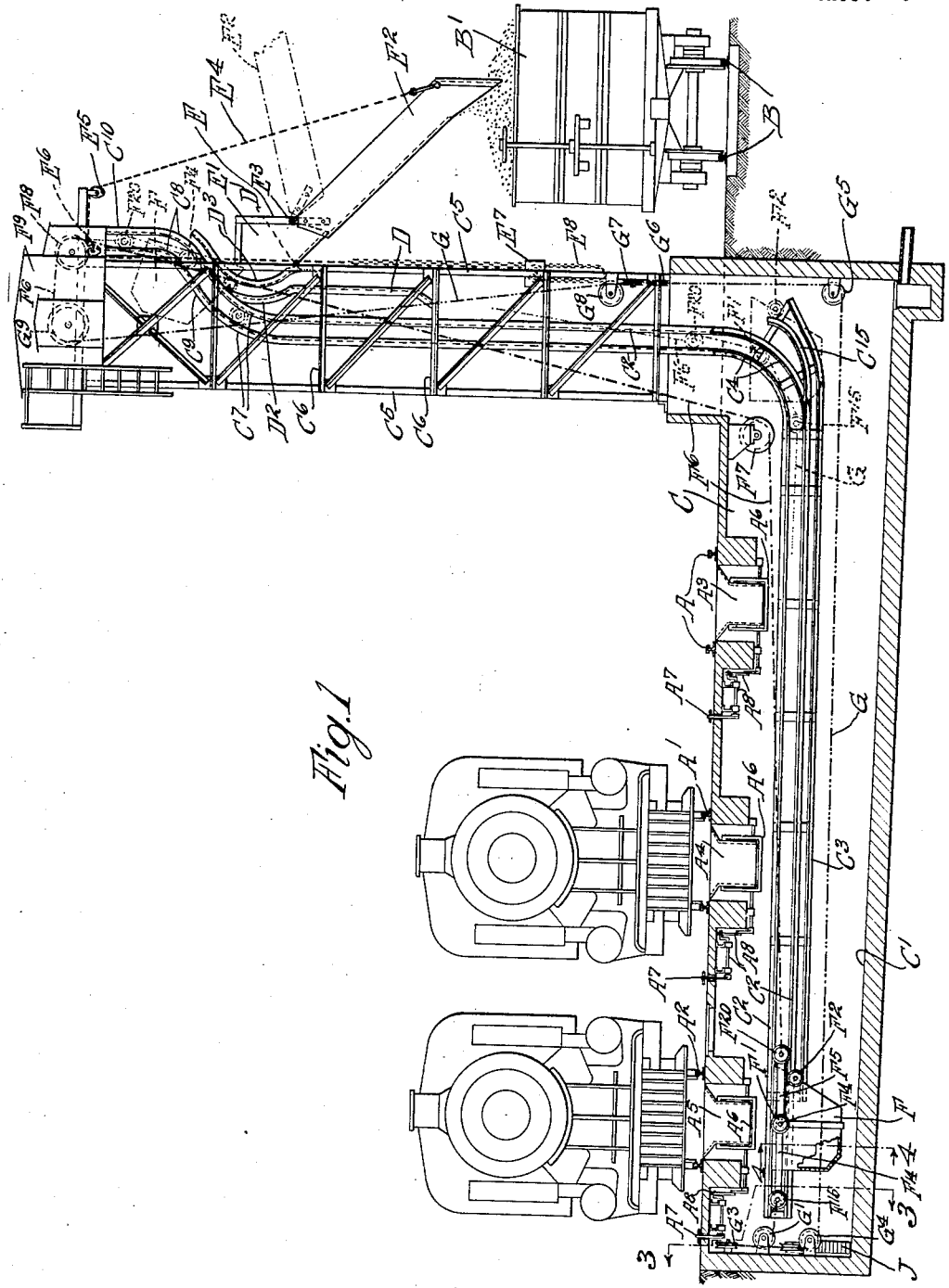
Figure 6:
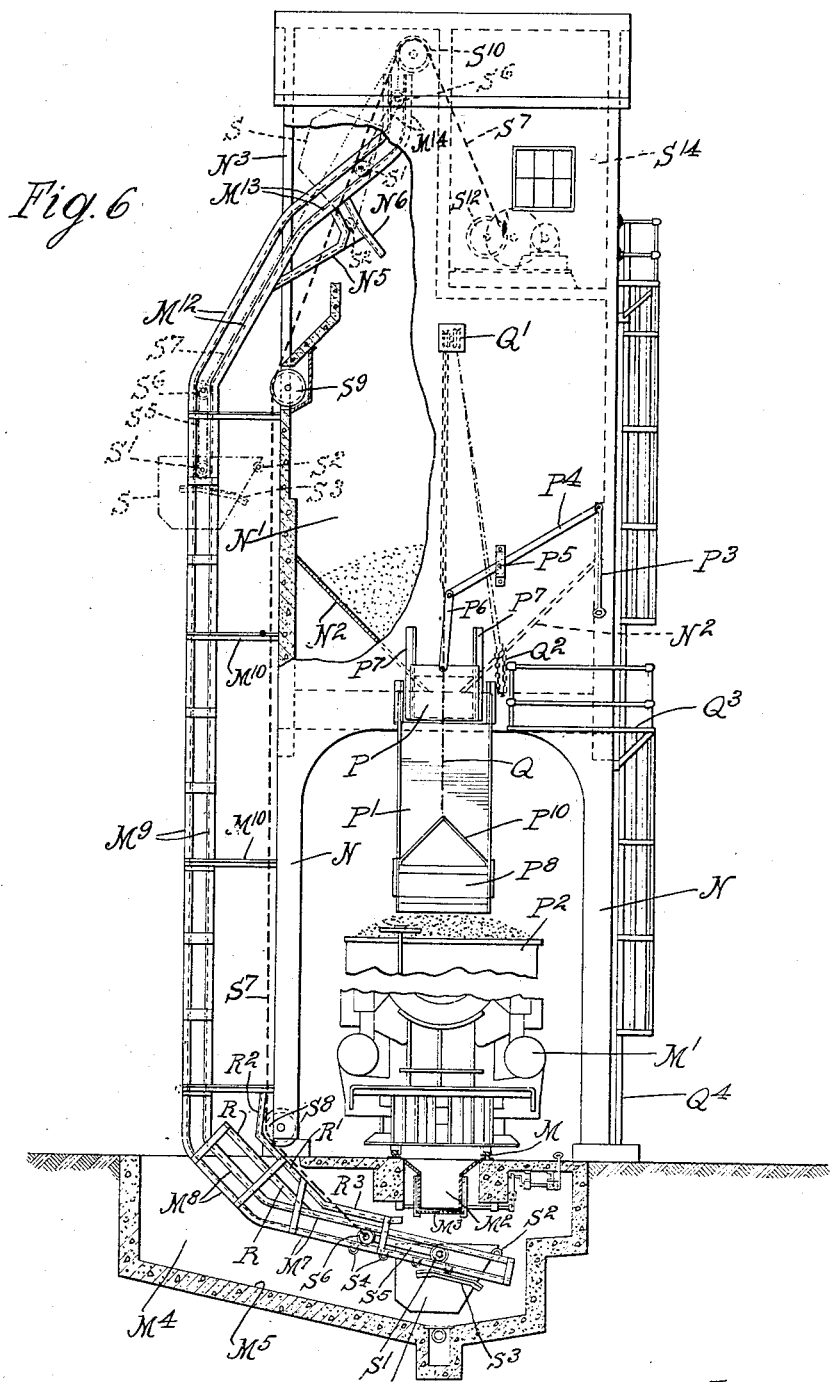

I illustrate my invention more or less diagrammatically in the accompanying drawings, wherein—
Figure 1 is a transverse vertical section;
Figure 2 is a top plan view with parts broken away;
Figure 3 is a section along the line 3—3 of Figure 1;
Figure 4 is a section along the line 4—4 of Figure 1;
Figure 5 is a vertical section of a variant form; and
Figure 6 is a side elevation of another variant form with parts in section.

Like parts are indicated by like symbols throughout the specification and drawings.

Referring to Figures 1 to 4, A, $A^1$, $A^2$, indicate a plurality of cinder receiving tracks upon which locomotives can be spotted in order to discharge cinders into the hoppers $A^3$, $A^4$, $A^5$ having any suitable gates or closures $A^6$ operated for example by levers $A^7$ controlling the operating mechanism generally indicated as $A^8$.

B indicates a track upon which the cinder receiving car $B^1$ may be spotted.

C generally indicates a tunnel, herein shown with the inclined bottom $C^1$, which penetrates beneath the hoppers $A^3$, $A^4$, $A^5$. It is provided with horizontal parallel tracks or angles $C^2$ $C^2$ secured to the side walls of the tunnel, and with supplemental tracks $C^3$ spaced beneath with the upwardly curved end portion $C^{15}$. The tracks $C^2$ are upwardly turned as at $C^4$ and extend upwardly within the supporting structure $C^5$ having the usual transverse bracing members $C^6$.

The bucket guides or tracks $C^2$ are shown as extending upwardly throughout the major portion of the height of the structure $C^5$, where they terminate in a curved portion $C^7$ and a recurved portion $C^8$, connected by the portions $C^9$ and finally terminating in a short vertical back portion $C^{10}$.

Secured to the supporting structure $C^5$ running parallel with the main vertical section of the track $C^2$ are the parallel supplemental tracks D $D^1$, corresponding to the tracks $C^3$ and a horizontal section. They terminate at their upper ends in arcuate or inclined portions $D^2$ $D^3$ opposite the curved track portion $C^7$ but converging thereto.

E indicates a vertical baffle, the wings $E^1$ of which serve as gusset plates and are connected to the supporting structure $C^5$. $E^2$ is a delivery apron or chute pivoted as at $E^3$ to the wings $E^1$, and adapted to be raised or lowered by means of a cable $E^4$ supported and guided by sheaves $E^5$ $E^6$ and continuing to a chain hoist $E^7$ operated by a hand chain $E^8$.

F is a hoist bucket having a pair of supporting wheels $F^1$ adapted to engage the tracks $C^2$ and an additional pair of guiding wheels $F^2$ adjacent the top of one side of the bucket, but at a lower level than the wheels $F^1$.

Pivotally mounted upon the pins $F^4$ which carry the rollers $F^1$ are the bales $F^5$ $F^{14}$. To $F^5$ may be secured the hoist cable $F^6$. $F^{15}$ $F^{20}$ are pairs of rollers carried by the bales. $F^7$ is an idler adjacent the opening of the tunnel C which engages the hoisting cable $F^6$. $F^8$ is a sheave located within the housing $F^9$ carried by the supporting structure $C^5$, and $F^{10}$ is a hoist drum adapted to be actuated by any suitable mechanism within the housing $F^9$, which may be speed reducing gears driven by a motor $F^{12}$.

To the bale $F^{14}$ is the tail cable G, guided and supported by idler sheaves $G^1$ $G^2$ $G^3$ $G^4$ rotatably mounted upon the end wall of the tunnel C. Positioned between the idlers $G^2$ $G^3$ is a counterweight J carried by the cable G by means of a sheave $J^1$, said counterweight being adapted to take up any slack of the cable G. The tail cable continues along one side of the tunnel and is wound about an idler $G^5$ at the opposite end of the tunnel adjacent the entrance, thence extending upwardly about the idlers $G^6$ $G^7$ and $G^8$, the idler $G^8$ being located at the outside of the structure $C^5$. The tail cable continues upwardly and is dead ended upon a drum $G^9$ mounted upon the shaft which carries the hoist drum $F^{10}$.

Referring to Figure 5 I have illustrated a cinder handling plant particularly adapted for a single decindering track shown at H, though more may be employed. $H^1$ indicates a hopper with gate $H^2$ and controlling mechanism $H^3$ manipulated by the lever $H^4$ projecting through a slot in the tunnel I, herein shown with an inclined bottom $I^1$, which penetrates beneath the hopper $H^1$. The two vertical side walls of the tunnel are provided with inclined parallel tracks $I^2$ upwardly turned at their ends, as at $I^3$ and extending upwardly, the general construction of the mechanism of the tower being identical with the form previously described, and carrying, in Figure 5, the same indicating characters. $I^4$ indicates supplemental tracks running parallel beneath the tracks $I^2$, the lowest ones being preferably longer, said tracks $I^4$ being turned upwardly as at $I^5$. J indicates a hoisting bucket with rollers $J^1$ rotatably mounted upon pins $J^2$ which carry the bale $J^3$ with attached rollers $J^4$ adapted to ride in the tracks $I^2$. $J^5$ are rollers secured to one end of the bucket J, at a somewhat lower level, and engaging the supplemental tracks $I^4$ when the bucket descends into the tunnel I.

K is a hoisting cable secured to the bale $J^3$ and extending upwardly over the idler $K^1$ adjacent the open end of the tunnel and continuing over the sheave $K^2$ to the drum $K^3$ which may be actuated by any suitable mechanism within the housing $K^4$. The general construction and location of the cinder delivering chute or apron and receiving cars are identical with the form previously described and are indicated by like symbols.

Figure 6 illustrates a cinder handling plant adapted for a single track M from which locomotives $M^1$ may discharge cinders into the hopper $M^2$ having the controlling gate $M^3$ actuated by any suitable means such as previously described. $M^4$ is a tunnel or pit with inclined bottom $M^5$ penetrating beneath the hopper $M^2$. Secured to the side walls of the tunnel are the parallel inclined track sections $M^7$ with the upwardly turned portions $M^8$ extending vertically as at $M^9$, to a predetermined height. The track sections $M^9$ are supported by lateral braces $M^{10}$ upon any suitable material storage structure positioned above the track M, herein shown as a typical tower including the supporting members N the hopper or bin $N^1$ with the inclined walls $N^2$. The bin $N^1$ is open as at $N^3$ to receive the inclined track portions $M^{12}$ and $M^{13}$ and the vertical track sections $M^{14}$ continuing to the top of the hopper $N^1$. $N^5$ $N^6$ are tracks or guides projecting through the opening $N^3$ within the bin $N^1$ the purpose of which will later appear.

Discharge of material from the bin or hopper $N^1$ is accomplished by opening the gate P, thus allowing contents to flow over the discharge chute $P^1$ located above the track M into the cinder receiving car $P^2$ supported on said track M. The gate P is operated by manipulating the handle $P^3$ which actuates the lever $P^4$ pivoted as at $P^5$, with the connecting link $P^6$ pivoted to the gate P which is slidably mounted between the guiding members $P^7$. The discharge chute $P^1$ is provided at its outer end with a baffle plate $P^8$ to check the throw of the down flowing material. Any suitable means for lowering and raising the hinged discharge chute $P^1$ may be provided, it being herein shown as a cable Q attached to the bale $P^{10}$ fastened to the chute. The cable Q continues to a chain hoist $Q^1$ actuated by manipulating the chain $Q^2$ from the operator's platform $Q^3$ accessible by means of the ladder $Q^4$.

R $R^1$ indicate supplemental tracks, the track R running parallel with the inclined track sections $M^8$, a portion of the track $R^1$ being parallel with the track R, and having the upwardly turned end portion $R^2$. The opposite end $R^3$ of the track $R^1$ is parallel with and above the inclined tracks $M^7$.

S indicates a hoist bucket having a pair of supporting wheels or rollers $S^1$ adapted to engage the tracks $M^7$, and an additional pair of guiding wheels $S^2$ adjacent the top of one side of the bucket. $S^3$ is a guiding member or angle, mounted, one on each side, on the bucket S, said members $S^3$ being adapted to engage rollers $S^4$ mounted on the lower track sections $M^7$. $S^5$ is a pivoted bale supporting a pair of guide wheels $S^6$. Secured to the bale $S^5$ is a hoisting cable $S^7$ extending upwardly over the idlers $S^8$ and $S^9$ and continuing over a sheave $S^{10}$ to a hoisting drum $S^{12}$, upon which it is dead ended; said drum $S^{12}$ may be actuated by any suitable mechanism within the operating room $S^{14}$ on top of the tower.

It will be realized that whereas I have described and shown a practical and operative device, nevertheless many changes might be made in size, shape, number and disposition of parts without departing from the spirit of my invention. I therefore wish my drawings to be taken as in a broad sense illustrative or diagrammatic rather than as limiting me to my specific showing.

The use and operation of my invention are as follows:

In locomotive upkeep it is necessary constantly to remove from the locomotives the products of combustion in the form of ashes and cinders. It is important to decinder locomotives as rapidly as possible with a minimum track space and maximum flexibility. It is also important that a plurality of locomotives may decinder at the same time and, in order to keep down the cost of installation, that a minimum of excavation and structure be necessary. I have developed a peculiarly compact and efficient and easily and cheaply constructed installation wherein locomotives may be easily and quickly decindered. As illustrated in Figures 1 to 4 my plant may include a plurality of decindering tracks and a cinder car track. Beneath the decindering tracks are hoppers and beneath the hoppers extends a tunnel into which can run a hoist bucket. I provide any suitable means for controlling the flow of material from the hoppers and preferably the hoppers are of such size as to be able to accumulate a quantity of material, the cinders being held in each hopper until the bucket is spotted therebeneath, and then released by the release of the gates employed. When filled the bucket is hoisted, by rotation of the drum $F^{10}$ which reels in the cable $F^6$. When the bucket is in the tunnel it is supported by the wheels $F^1$ engaging and held between the tracks $C^2$ $C^2$, as are also the wheels $F^{20}$ on the bale $F^5$ and the wheels $F^{15}$ of the bale $F^{14}$. The bucket, being pivotally carried by the pins $F^4$, is held in upright position by the rollers $F^2$ engaging the supplemental tracks $C^3$ and the lower track $C^2$, thus preventing any rocking or swinging of the bucket. When the bucket F reaches the bent portion $C^4$ of the track $C^2$, the supplemental rollers or wheels $F^2$ will leave the supplemental track $C^3$ and the curved extension guide track $C^{15}$, as shown in dotted lines in Figure 1. The wheels $F^1$ supporting the hoist bucket and wheels $F^{15}$ and $F^{20}$ of the bales will follow the path of the tracks $C^2$ with its curved and inclined portions $C^7$ $C^8$ $C^9$ $C^{10}$. In the dumping position of the bucket the supplemental wheels $F^2$ are in engagement with the curved portions $D^2$ $D^3$ of the supplemental tracks D, $D^1$ which causes the bucket to assume a position as shown in dotted lines in Figure 1, thus tilting the bucket and dumping the cinders on to the discharge chute or apron $E^2$ which delivers said cinders into the cinder receiving car $B^1$ on track B. The chute $E^2$ may be raised and lowered by means of the chain hoist $E^7$.

In the hoisting of the bucket, the rotation of the drums $F^{10}$ and $G^9$ and winding of its attached cables reels in the hoist cable $F^6$ and unwinds the tail cable G. By reversing of the rotation of the drum, the bucket is lowered and the tail cable moves the bucket in the desired position within the tunnel. The bucket is constantly held between the attached hoisting cable $F^6$ and the tail cable G, any stretching of either cable being taken up by the counterweight J.

It will be obvious that I may use any desirable means for automatically or non-automatically controlling the hoisting excursion or the timing and frequency of the trips may be handled manually. I have not illustrated the details of controlling mechanism of the hoist, since they form no part of the present invention.

In Figure 5 I have illustrated a cinder handling plant suitable for a single decindering track H, though a plurality of decindering tracks may be employed. The bucket is provided only with a hoisting cable K, for upward movement, downward movement of the bucket being in response to gravity. The hoisting, dumping and disposal of material are identical as described in the previous form.

Figure 6 illustrates a cinder handling plant adapted for a single track. It includes the track M supporting the locomotive $M^1$ which may discharge cinders into the hopper $M^2$. The cinders being held in the hopper until the bucket is spotted beneath and being released by opening of the gates. When filled the bucket is hoisted by rotation of the drum $S^{12}$ which reels in the cable $S^7$. When the bucket is in the tunnel, beneath the hoppers, it is supported by the wheels $S^1$ engaging the tracks $M^7$. The bucket is provided with the supplemental wheels $S^2$ riding upon the upper face of the upper track $M^7$ and with additional guide members $S^3$ engaging fixed rollers, the purpose of which is to keep the bucket in its upright position and to prevent swinging, when at the cinder receiving position. When the bucket is hoisted the bucket supporting roller will follow the path of the track portions $M^7$ $M^8$ $M^9$ $M^{12}$ and $M^{13}$. The supplemental rollers $S^2$ will travel for a distance upon the upper track $M^7$ and thence between the supplemental tracks or guides R and $R^1$. Upon leaving said tracks the supplemental wheels $S^2$ are idle until they come in contact with the tracks $N^5$ $N^6$ the result of which contact is the tilting of the hoist bucket as shown in dotted lines in Figure 6, thus dumping the cinders into the bin or storage hopper $N^1$.

When it is desired to empty the hopper, a cinder receiving car $P^2$ may be spotted upon the track M beneath the discharge chute $P^1$ and the gate P is opened by manipulating the handle $P^3$.

I claim:

1. In a skip hoist installation including an elevated structure and an adjacent track hopper, a bucket, guiding and supporting tracks for said bucket, said tracks penetrating beneath said hopper and extending upwardly on said elevated structure, said bucket being provided with a single pair of track engaging supporting rollers, the axis of said rollers being above and substantially over the center of gravity of the bucket, the bucket being pivotally supported about said axis, a haulage bail, pivoted to said bucket, and track engaging rollers at each side thereof.

2. In a skip hoist installation including an elevated structure and an adjacent track hopper, a bucket, guiding and supporting tracks for said bucket, said tracks penetrating beneath said hopper and extending upwardly on said elevated structure, said bucket being provided with a single pair of track engaging supporting rollers, the axis of said rollers being above and substantially over the center of gravity of the bucket, the bucket being pivotally supported about said axis, a haulage bail, pivoted to said bucket, concentrically with said supporting rollers, and track engaging rollers at each side thereof.

3. In a skip hoist installation including an elevated structure and an adjacent track hopper, a bucket, guiding and supporting tracks for said bucket, said tracks penetrating beneath said hopper and extending upwardly on said elevated structure, said bucket being provided with a single pair of track engaging supporting rollers, the axis of said rollers being above and substantially over the center of gravity of the bucket, the bucket being pivotally supported about said axis, a plurality of haulage bails pivoted to said bucket and track engaging rollers at each side thereof.

4. In a skip hoist installation including an elevated structure and an adjacent track hopper, a bucket, guiding and supporting tracks for said bucket, said tracks penetrating beneath said hopper and extending upwardly on said elevated structure, said bucket being provided with a single pair of track engaging supporting rollers, the axis of said rollers being above and substantially over the center of gravity of the bucket, the bucket being pivotally supported about said axis, a plurality of haulage bails pivoted to said bucket and track engaging rollers at each side thereof, concentrically with said supporting rollers.

5. In a skip hoist installation which includes an elevated structure and an adjacent track hopper, a bucket and guiding and supporting tracks therefor, said tracks penetrating beneath said hopper and extending upwardly on said elevated structure, each such track including a pair of opposed equi-distant track members, a track engaging single pair of bucket supporting rollers pivotally carried by said bucket, above and substantially over the center of gravity of the bucket, and penetrating said opposed track members the bucket being pivotally supported from the axis of said rollers, a haulage bail, pivoted to said bucket concentrically with said supporting rollers, and track engaging rollers at each side of said haulage bail, adapted to penetrate between and be guided by said track members.

6. In a skip hoist, a skip bucket, a track on which the bucket operates, means to support the bucket on said track including a single pair of bucket supporting rollers above and substantially over the center of gravity of the bucket, said bucket being pivotally supported from the axis of said rollers, a haulage bail pivotally secured to the bucket about the axis of said supporting rollers, guide rollers carried by the bail at its forward end, said guide rollers and supporting rollers simultaneously engaging said track, said track including a substantially vertical section and a substantially horizontal section, the guide rollers when traversing said vertical section of track being in superposed relation to the supporting rollers and both sets of rollers being above and substantially over the center of gravity of the bucket.

Signed at Chicago, county of Cook and State of Illinois, this 22nd day of December, 1927.

CLYDE P. ROSS.